United States Patent [19]
Kane

[11] Patent Number: 5,891,361
[45] Date of Patent: Apr. 6, 1999

[54] METHOD FOR PREPARING SMALL PARTICLE SIZE FLUORIDE UP-CONVERTING PHOSPHORS

[75] Inventor: James Kane, Lawrenceville, N.J.

[73] Assignee: Sarnoff Corporation, Princeton, N.J.

[21] Appl. No.: 850,740

[22] Filed: May 2, 1997

Related U.S. Application Data

[60] Provisional application No. 60/019,368 Jan. 5, 1996.

[51] Int. Cl.⁶ .................................................. C09K 11/85
[52] U.S. Cl. .................................. 252/301.4 H; 423/464; 423/263; 423/489
[58] Field of Search .................. 252/301.4 H; 423/464, 423/263, 489

[56] References Cited

U.S. PATENT DOCUMENTS

| | | | |
|---|---|---|---|
| 3,541,018 | 11/1970 | Hewes et al. | 252/301.4 |
| 3,956,147 | 5/1976 | Becker et al. | 423/489 |
| 4,021,530 | 5/1977 | Layne et al. | 423/489 |
| 5,015,452 | 5/1991 | Matijevic | 423/263 |
| 5,674,698 | 10/1997 | Zarling et al. | 435/7.92 |

OTHER PUBLICATIONS

Canadian Patent No. 936351, Issued Nov. 6, 1973.
International Publication Number WO 96/01297, Published 18 Jan. 1996.

*Primary Examiner*—Melissa Bonner
*Attorney, Agent, or Firm*—William J. Burke

[57] ABSTRACT

Spherical particles of fluoride up-converter phosphors having a particle size of 1 micron and less can be made from their corresponding precursor hydroxycarbonate particles by heating the hydroxycarbonate particles in an oxygen-containing atmosphere to convert the hydroxycarbonate to the corresponding oxide but without changing the size and shape of the particles, and then heating the phosphor oxide particles to their corresponding fluoride particles by heating in $SF_6$, at a temperature that will crack the $SF_6$ but will not change the size or shape of the phosphor particles.

10 Claims, No Drawings

METHOD FOR PREPARING SMALL PARTICLE SIZE FLUORIDE UP-CONVERTING PHOSPHORS

CROSS-REFERENCE TO RELATED APPLICATION

This non-provisional U.S. national application, filed under 35 U.S.C. 111(a) claims, under 35 U.S.C. 119(e)(1), the benefit of the filing date of provisional U.S. application no. 60/019,368, filed under 35 U.S.C. 111(b) on Jun. 5, 1996.

FIELD OF THE INVENTION

This invention relates to the preparation of fluoride up-converter phosphor particles having a uniform, spherical, small particle size of one micron or less.

BACKGROUND OF THE INVENTION

Phosphors typically comprise one or more rare earth metals in a host material. Up-converter phosphors emit light in the visible wavelength radiation range (550–800 nanometers) when excited by long wavelength radiation, e.g., light in the infrared wavelength spectrum. This is accomplished by multiple absorption of infrared photons and energy transfer between the absorbing and emitting ions. For example, it is known that yttrium fluorides doped with certain activator couples such as ytterbium and erbium, will be excited by 0.98 micron wavelength radiation. Such radiation can be provided by semiconductor lasers.

Such phosphors have been tried as phosphorescent labels for biological assays. Detection methods for macromolecules such as proteins, drugs, polynucleotides and the like include an analytical reagent that binds to a specific target macromolecular species and produces a detectable signal, which is provided by a label such as a radioisotope or a covalently-linked fluorescent dye or phosphor.

Up-converting phosphors have several advantages over other known materials, such as radioisotopes and covalently-linked fluorescent dyes, for such label applications. Radioimmunoassays, while they are sensitive, use radioactive materials which are potential health hazards for the operators of the tests, and they also require special handling and present expensive disposal problems. Radioisotopes are unstable, and they do not produce strong signals in the ultraviolet, infrared or visible portions of the electromagnetic spectrum, and thus they cannot be used for methods including microscopy, image spectroscopy and flow cytometry that employ optical methods for detection of the label.

Fluorescent labels have come into widespread use for such assay methods. They include small organic dye molecules that can be illuminated with light of a particular excitation frequency, so that they give off emissions that can be detected by electro-optical sensors. However, these dyes have a short lifetime and they bleach in the presence of light.

The use of up-converting phosphors for immunoassays has been disclosed. These phosphors can be excited by photons of a frequency which can be provided by inexpensive near-infrared laser diodes or light-emitting diodes for example, and they emit light of a lower frequency band, in the visible range. Thus the photons of the emitted radiation are of higher energy than the excitation energy, and the emitted radiation is "up-shifted" from the excitation radiation. This reduces the background noise of the visible emission signal. Solid state diode lasers can be tailored to operate at a variety of wavelengths in the near infrared range, and they are inexpensive.

In order to use them as labels, the phosphor particles should be small, such as one micron or less, and they should desirably have a uniform particle size and morphology. The size, weight and morphology of the particles are important because they affect the strength of particle binding, and the specificity of the separation process of the assay. Further, since in an assay application each of the particles should have a like number of active binding sites, it is also desirable that the particles be of similar size.

Small particle size oxide and oxysulfide up-converter phosphors are known that have uniform particle size of one micron or less, and the particles are all spherical.

Fluoride up-converter phosphors are more efficient than other phosphor hosts, such as the oxides and oxysulfides, and they do not saturate as readily at high infrared flux. Since newer laser diodes have high power, saturation of the phosphor probes is becoming a limitation in the sensitivity of assays. However, such fluoride up-converter phosphors have not been available up to the present time. Attempts to prepare fluoride phosphors by reaction with ammonium fluoride have not been successful.

Submicron sized phosphor particles are also useful as pigments for ink jet printer inks. The phosphor particles can be coated or encapsulated so that they can be suspended in an ink formulation. However, the present phosphors are only available in particles that are about 10 microns in size. Since ink formulations require the phosphor particles to be about 1 micron or less in size, the particles must be milled to reduce their size. Thus at present, small particle size, e.g., less than one micron size particles, fluoride phosphors are only available as milled particles. Milling does not produce uniform particle sizes however, but rather a gaussian-type distribution of particle size is obtained. Thus the present requirement that all pigment particles be less than one micron cannot be obtained for fluoride phosphors even when the average particle size is less than one micron without a separation process, which would be very difficult and expensive.

It is believed that small, uniform particle size up-converter fluoride phosphors would have superior luminescent efficiency over oxide or oxysulfide phosphors, and would be highly desirable for use in ink jet printer inks as well as for use in diagnostic assays.

SUMMARY OF THE INVENTION

I have found that fluoride up-converter phosphors that have uniform, spherical particles that are less than one micron in size can be made. A small spherical particle size host hydroxycarbonate is first made by precipitation from dilute solution. These small particle size particles are then heated in air to form the corresponding oxides, under conditions that retain the shape and particle size of the hydroxycarbonate precursor particle. The oxides are then heated in the presence of sulfur hexafluoride at a temperature high enough to crack the $SF_6$ and form the corresponding fluoride from the oxide compound, but low enough so that the particle size, shape or morphology of the particles is not affected. Thus uniform, small, spherical particles of the phosphor fluoride are obtained.

DETAILED DESCRIPTION OF THE INVENTION

The fluoride phosphor particles of the invention are spherical in size and have a diameter less than one micron.

Desirable phosphor hosts useful to make the fluoride phosphors of the invention include yttrium, lanthanum or gadolinium containing an appropriate rare earth activator and sensitizer pair, for example ytterbium and erbium. Erbium can be replaced by holmium or thulium activators using ytterbium as the sensitizer. An efficient fluoride phosphor composition for excitation at 0.98 micron $(Y_{0.8}Yb_nEr_m)F_3$ wherein n is an integer of 0.2-m and m is an integer from 0.01 to 0.02, suitably is $(Y_{0.8}Yb_{0.18}Er_{0.02})F_3$ although the proportion of ingredients can be varied somewhat.

The first step in preparing the present phosphors is the precipitation of hydroxycarbonate particles having a uniform, small spherical particle size. A dilute solution of a rare earth water-soluble salt, such as the nitrate, is mixed together with water-soluble salts of the activator/emitter couple in the desired molar proportions of the desired phosphor to be made. A compound that releases hydroxyl ions by hydrolysis, such as urea, is added to the rare earth solution. The mixture is digested until the rare earth hydroxycarbonate particles precipitate, visible as a cloudiness in the solution. The resultant identical particles are less than one micron in size, and are spherical. This reaction is continued until the supply of rare earths in the solution has been depleted.

The phosphor hydroxycarbonate particles are collected, as by centrifugation, and then fired in an oxygen-containing atmosphere, such as air, to convert the hydroxycarbonate to the corresponding oxide. The firing temperature is important to maintain a small particle size. The firing temperature during conversion of the hydroxycarbonate to the oxide must be maintained in the range of about 700°–1000° C. The preferred temperature is about 700° C., when any residual urea and moisture in the particles will be removed. Higher temperatures are less preferred because they are more likely to produce aggregate oxide particles that are irregularly shaped.

The resultant rare earth oxides are then fired at temperatures of about 750°–800° C. in the presence of sulfur hexafluoride ($SF_6$) which can be diluted with nitrogen or another inert gas. The reaction can be carried out in a quartz tube to prevent attack on the quartz by fluorine. A reactor tube also can be lined, as with alumina, which is inert to fluorine at temperatures less than about 1000° C. This was confirmed by heating a highly polished sapphire wafer at 750° C. in the presence of $SF_6$ for several hours. No etching of the surface of the wafer was evident.

$SF_6$ at room temperature is an inert, non-toxic gas. It can be handled with ease through brass regulators and metered with glass flowmeters. This gas cracks at temperatures in excess of 650° C. to produce fluorine species that are highly reactive, e.g., have an activity comparable to elemental fluorine. However, higher temperatures are required to obtain the yttrium fluoride compound. Much higher temperatures should be avoided because they result in a loss of the spherical morphology of the particles, and in grain growth. At temperatures below about 800° C., such as about 750°–800° C., an oxygen-containing compound of yttrium oxyfluoride may be obtained as an impurity in the fluoride phosphor; however, since this compound is also a highly efficient up-converter phosphor, with an efficiency comparable to yttrium fluoride, the presence of this oxygen impurity is not detrimental and the resultant fluoride phosphor product is useful also as an up-converter phosphor. Temperatures high enough to form aggregates of the phosphor particles are also to be avoided, because an extra step of sonication or milling may be required to break up the aggregates, adding to the costs of manufacture.

The above described reaction of the phosphor oxide and $SF_6$ can also be advantageously carried out using fluidized bed techniques. Since this method suspends particles in a gas stream, the particles are kept more separate than when using a crucible or boat to heat the particles. This minimizes the problem of forming aggregates. The use of a cold wall quartz or quartz-lined reactor using an RF heated susceptor also minimizes attack of the walls of the reactor by the fluorine-containing agents.

That the particles produced by the present process are not only sub-micron in size, but also of the same size and shape and of uniform morphology is highly important for use in assays. The assays work by determining if an antibody-antigen reaction causes the particle to adhere to the walls of a well in a titer plate, or whether it is washed away. Since "sticking" to the well is also a function of particle size, weight and shape, that the present particles are uniform in size and shape is important, since the number of antibody-antigen adhesion sites is also a function of the surface area and size of the particle. Thus each particle of like size will have an equal number of potential adhesion sites when performing a quantitative assay.

The uniform size of the spherical particles produced herein, and that the size is less than one micron, is also advantageous in preparing ink jet printer inks where a tight distribution of submicron particles is required.

The process of the invention will be further described in the following examples, but the invention is not meant to be limited to the details described therein.

EXAMPLE 1

An aqueous solution of yttrium, ytterbium and erbium nitrates in a proportion so as to produce $Y_{0.8}Yb_{0.19}Er_{0.01}$ was made. An aliquot of this solution containing 0.2 mol of the mixed oxide was added to a five liter container and diluted to 3.5 liters with water.

70 Grams of urea dissolved in 0.5 liter of water was added and the solution was heated to boiling for several hours, when the rare earth hydroxycarbonate precipitated out. The reaction was continued until the solution was depleted of rare earth metals.

The precipitate was collected by centrifugation, washed and dried. The particles were spherical and had a particle size of about 0.4 micron. The particles were then fired in air at 700° C. to convert the hydroxycarbonate phosphor to its corresponding oxide phosphor.

The oxides were then converted to the highly efficient corresponding fluoride phosphor by heating 20.0 grams of the oxide phosphor in an alumina boat in an alumina-lined quartz tube to 750° C. in nitrogen and passing a low flow of $SF_6$ through the tube. The reaction was continued for five hours.

The resulting yttrium fluoride phosphor was strongly luminescent under 50 milliwatts of 0.98 micron laser power. X-ray diffraction analysis confirmed that the material was essentially yttrium fluoride with a small impurity phase of yttrium oxyfluoride. SEM confirmed that the material still retained its 0.4 micron spherical morphology but with some degree of aggregation.

EXAMPLE 2

Following the procedure of Example 1, 25.0 grams of $Y_{0.80}Yb_{0.18}Er_{0.02}$ oxide was heated in an alumina boat at 800° C. under a low flow of $SF_6$ maintained for five hours.

The resultant fluoride phosphor was strongly luminescent under 0.98 micron excitation. It was confirmed to be single phase yttrium fluoride by X-ray diffraction analysis.

Although the present invention has been described by certain specific embodiments, the invention is not meant to be limited to the details described. The composition of the phosphors can be varied, as can the reaction conditions, times, temperatures and the like, as will be known to those skilled in the art. The invention is to be limited only by the scope of the appended claims.

I claim:

1. A spherical phosphor fluoride particle that emits light in the visible wavelength range when excited by long wavelength light that has a uniform particle size of less than one micron.

2. A phosphor fluoride according to claim 1 comprising a phosphor host selected from the group consisting of yttrium, lanthanum and gadolinium.

3. A phosphor fluoride according to claim 2 comprising an activator-sensitizer pair wherein the activator is ytterbium and the sensitizer is selected from the group consisting of erbium, holmium, terbium and thulium.

4. A phosphor fluoride according to claim 3 wherein the phosphor fluoride has the formula $(Y_{.8}Yb_nEr_m)F_3$ wherein n is an integer of 0.2-m and m is an integer from 0.01 to 0.02.

5. A method of making up-converting phosphor fluoride spherical particles having a uniform particle size less than one micron comprising
   a) preparing an aqueous solution of soluble salts of a phosphor host and an organic material that releases hydroxy ions by hydrolysis;
   b) precipitating hydroxycarbonate particles from said solution, said particles having a spherical shape and a uniform particle size of less than one micron;
   c) collecting the hydroxycarbonate particles;
   d) heating the hydroxycarbonate particles in an oxygen-containing atmosphere at a temperature in the range of about 700° C. to about 1000° C. to form the corresponding oxide compound while maintaining the particle size and spherical shape of the hydroxycarbonate particles; and
   e) heating the oxide particles in an atmosphere containing $SF_6$ to convert the majority of the oxide to the corresponding fluoride by heating at a temperature high enough to crack the $SF_6$ but below that temperature wherein the size and shape of the particles is affected.

6. The process according to claim 5 wherein the heating temperature of step e is maintained in the range of 750° to 800° C.

7. The process according to claim 5 wherein the phosphor host include a host material selected from the group consisting of yttrium, lanthanum and gadolinium.

8. The process according to claim 5 wherein the solution additionally contains soluble salts of an activator-sensitizer pair for said host material.

9. The process according to claim 5 wherein the activator is ytterbium and the sensitizer is selected from the group consisting of erbium, holmium, terbium and thulium.

10. The process according to claim 9 wherein the phosphor has the formula $(Y_{.8}Tb_nEr_m)F_3$ wherein n is 0.2-m and m is an integer from 0.01 to 0.02.

* * * * *